March 31, 1970     W. C. STAIRE     3,503,262

THERMOSTATIC REGULATOR

Filed July 19, 1968

INVENTOR
WALTER C. STAIRE
BY Peter L. Coetas
ATTORNEY

United States Patent Office 3,503,262
Patented Mar. 31, 1970

3,503,262
THERMOSTATIC REGULATOR
Walter C. Staire, Torrington, Conn., assignor to Tube Bends, Incorporated, New Britain, Conn., a corporation of Connecticut
Filed July 19, 1968, Ser. No. 746,134
Int. Cl. G01k 5/00, 5/44
U.S. Cl. 73—368.3                                13 Claims

ABSTRACT OF THE DISCLOSURE

A thermostatic regulator comprises a tubular body which is closed at one end and which has a piston slidably received therein adjacent the other end, with a cavity between the closed end and the piston. A solid thermoplastic material, which is expansively fusible at a preselected temperature above ambient, is contained in the cavity, and the volume thereof is sufficient to allow the material to bear upon the piston with a predetermined minimum hydraulic force when in the fluid state. The body has a cavity-constricting portion adjacent the piston which serves to restrain movement of the thermoplastic material toward the piston until it is substantially completely fluid at which point it may flow thereby. The hydraulic force brought to bear upon the piston when the thermoplastic material passes by the constricting portion drives it outwardly of the body against the opposing force of biasing means which is provided therein.

BACKGROUND OF THE INVENTION

Devices capable of producing movement in response to temperature changes are widely employed in association with many types of equipment to control processes and to provide safety. Certain of these devices are thermostatic actuators which respond at an elevated temperature to transmit the motion produced to a valve, switch or the like and thereby effect a change in or provide a control or relief for the system. These actuators are widely employed in closed vessels such as water heaters in conjunction with a valve for discharging part of the fluid therein to relieve the pressure or for modifying the rate of flow of fuel to the heating means.

One type of prior art actuator employs a hollow body partially filled with a thermoplastic material. The thermoplastic material has a positive coefficient of expansion so that heating thereof to the preselected control temperature causes it to expand against a piston to create the desired physical movement. The principal drawback of the prior art actuators of this sort is a lack of precision and reproducibility of temperature response. Because the solid thermoplastic material normally expands during the entire heating cycle, the piston may be driven prematurely or too gradually resulting in actuation over a relatively broad temperature range. Accordingly, accurate operation depends upon careful dimensioning of the parts and not so much upon the properties of the thermoplastic material which, most desirabiy are the primary factors determining the temperature at which operation occurs.

Accordingly, it is an object of the present invention to provide a relatively simple and economical thermostatic regulator which is operative over a very limited temperature range and which is capable of relatively precise temperature control.

Another object is to provide such an actuator which may be automatically reset for repeated operation and which maintains a high level of accuracy through many repetitions of heating and cooling cycles.

Still another object is to provide such an actuator which may be fabricated readily and economically without requiring critical control of the elements.

SUMMARY OF THE INVENTION

It has now been found that the foregoing and related objects may be readily attained in a thermostatic regulator comprising a tubular body and a piston slidably received therein adjacent one end thereof. Biasing means in the body adjacent the same end bears upon the piston to urge it towards the other end of the body, which is closed by suitable means spaced from the piston to define a cavity therebetween. Contained in the cavity is a solid thermoplastic material which is expansively fusible at an elevated temperature above ambient approaching the selected temperature of operation, and which is of a volume sufficient to cause it to bear upon the piston and to exert a hydraulic force thereon in the expansively fused state. The body has a cavity-constricting portion of reduced internal cross section adjacent the piston to restrain expansive movement of the thermoplastic material toward the piston until the material is substantially compleely fluid but permitting the substantially completely fluid material to flow by it and bear upon the piston to hydraulically drive it towards the one end of the body against the force of the biasing means when the preselected control temperature is reached.

The regulator desirably has a resilient seal seated in the cavity adjacent the face of the piston towards the thermoplastic material, the seal being dimensioned to span the width of the cavity with a peripheral surface thereof sildingly bearing against the sidewall of the body to provide sealing action preventing flow of the thermoplastic material thereabout. In preferred embodiments the regulator has a body which is generally circular in cross section and the thermoplastic material is a synthetic polymer.

DETAILED DESCRIPTION OF THE ILLUSTRATED EMBODIMENT

Figure 1:
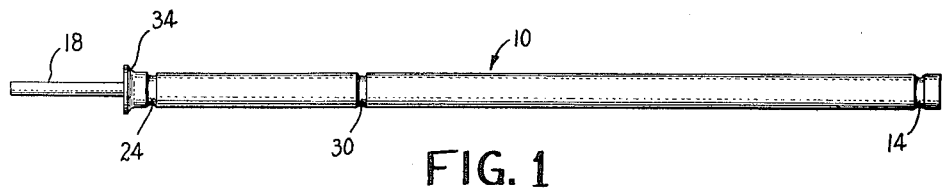
FIGURE 1 is a longitudinal view of a thermoplastic actuator embodying the present invention.
Figure 2:
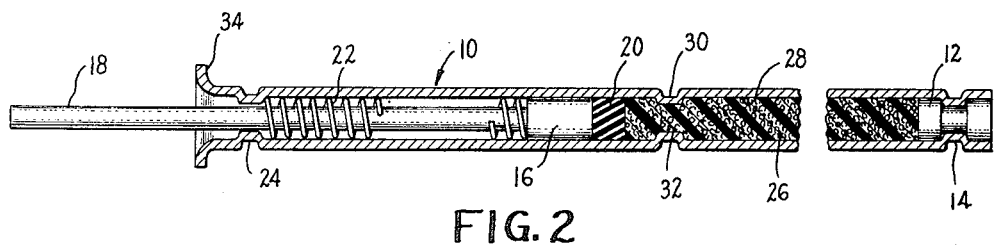
FIGURE 2 is a fragmentary sectional view of the actuator of FIGURE 1 with the thermoplastic material in the solid state.

Turning now in detail to the attached drawing, a thermostatic regulator embodying the present invention has a hollow tubular body, generally designated by the numeral 10, which is closed at one end by a dumbbell-shaped plug 12 inserted thereinto and secured therein by the crimped portion 14 of the body 10 which effects a mechanical interlock. Spaced from the closed end of the body 10 and slidingly received therein is a piston 16 which has a resilient seal 20 seated against the face thereof adjacent the closed end of the body. A piston rod 18 extends outwardly of the body 10 from the other face of the piston 16, and the body 10 is provided with an outwardly flared end portion 34 and a crimped portion 24 adjacent thereto providing an internal shoulder 25. A helical compression spring 22 is received within the body 10 and disposed about the rod 18 so that one end thereof bears upon the piston 16 and the other end thereof abuts against the shoulder 25. In this manner the spring 22 normally tends to urge the piston 16 and its rod 18 toward the closed end of the body 10. The crimped portion 24 also serves as a guide surface for the rod 18 to limit radial deflection thereof.

The cavity 28, provided by that portion of the body 10 extending between the seal 20 and the plug 12, is substantially completely filled with a normally solid, synthetic thermoplastic resin 26 which has a relatively high coefficient of thermal expansion. The crimped portion 30 in the body 10 provides a flow passage 32 of reduced internal cross section adjacent the seal 20.

Figure 3:
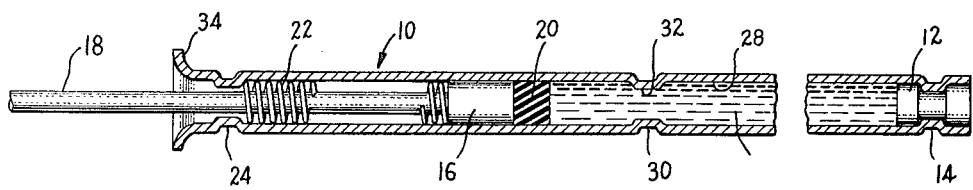
FIGURE 3 is a fragmentary sectional view of the actuator of FIGURE 1 with the thermoplastic material in a fluid and expanded state and showing the displacement of the piston and rod thereby.

Operation of the regulator can best be understood by reference to FIGURE 3 wherein it is depicted with the thermoplastic resin 26 in a fluid state in which it has expanded in volume and flowed past the restricted flow passage 32. Although some thermal expansion would normally occur as the temperature of the synthetic resin 26 increases before it reaches its molten point, the reduced flow passage 32 restricts the expansion of the main portion thereof in the cavity 28 disposed toward the plug 12 while it is still a solid, thus producing internal pressure. Substantially complete fluidization of the resin 26 allows it to flow past the restricted flow passage 32 and apply hydraulic force upon the seal 20 to drive it, along with the piston 16 and the attached rod 18, axially toward the end portion 34 against the opposing force of the helical compression spring 22. In this manner, a valve or other device (not illustrated) may be actuated by the rod 18.

In its preferred form, the body has a circular cross section so as to permit use of readily available tubing and most advantageous fabricating techniques for the components and for the assembly itself. However, other cross sections such as square or oblong may be desirable for some applications depending upon special mountings or exposure of only portions of the body to the heated medium. The body is normally greatly elongated, i.e., has a high ratio of length to width, in order to provide a relatively thin column of thermoplastic material in the desired volume and, accordingly, optimum uniformity of heat transfer into and through the thermoplastic material. This eliminates spurious action and at the same time accommodates a sufficient volume of the thermoplastic material in the body cavity to provide the desired hydraulic action.

The sidewall of the body must be of sufficient thickness to resist internal forces caused by the expansion of the thermoplastic and to provide sufficient structural strength to the assembly, but it should be thin enough to afford efficient heat transfer and responsiveness to temperature changes. The material of the body has an important effect upon heat transfer and certain metals and alloys, such as copper, brass, aluminum, etc., have much higher values of thermal conductivity than others, and all of these factors should be considered in determining the best sidewall thickness in each case. As regards the choice of body material resistance to corrosion and other deteriorative effects of the environment, which might hamper operation of the actuators or significantly shorten their useful lives, should also be considered. In practice, copper and its alloys have proven quite satisfactory.

The temperature of actuation is almost wholly dependent upon the thermal characteristics of the thermoplastic material contained therein. This is largely attributable to the constricted cavity portion which restrains expansion of the thermoplastic material until it is substantially completely fluidized. It is therefore important to balance the size of the constricted opening and the amount and properties of the thermoplastic material employed. The opening must be large enough to allow the material to pass when it has become substantially completely fluidized and yet small enough to prevent passage of a significant quantity thereof prior to that time. The danger of extruding unduly large amounts of the thermoplastic while in an insufficiently fluid state, due to internal pressures created by the rise in temperature, should also be taken into account. The configuration of the cavity and the volume of material therein are also important, since they influence the amount of force produced by expansion, as is the viscosity of the thermoplastic material at elevated temperatures. Suitable relative cross-sectional areas will normally be provided if the ratio of the diameters of the cavity to the constricted portion is from about 1.25 to 4:1 for circular members.

The constriction may be provided in the cavity by any suitable means, and a separate piece, such as a properly dimensioned ring, may be inserted into the body and secured to the sidewall thereof for this purpose by any suitable means such as crimping, brazing, welding, etc. More conveniently the constricted portion is provided simply by crimping the body of the actuator adjacent the piston. It is important that the constricted portion be properly located so as to minimize the amount of thermoplastic between the restricted portion and the piston when the material is in its normally unexpanded state, and ideally the constricted portion is closely adjacent the face of the piston or the seal when such is employed therebetween. If this is not done and there is a significant quantity of material directly adjacent the piston, this portion of the material may expand freely during the heating cycle, as in the prior art devices, and drive the piston partially through its path of movement at a temperature lower than that for which the actuator is designed. However, when the constricted portion is provided by crimping the body, it is much more practical to provide the crimp at a location slightly spaced along the cavity from the piston (or its seal) to ensure that the piston (or its seal) is not immobilized or restricted thereby. It has been found that a small amount of material between the constricted portion and the piston does not detract significantly from the precision of temperature response since full movement of the piston is dependent upon the expansion of the entire body of thermoplastic material.

Although low fusing metal alloys might be employed for the thermoplastic material, it has been found extremely advantageous to use natural and synthetic organic materials of polymeric nature. The specific thermoplastic material selected will depend upon the preselected control temperature, but most dependable operation is provided by synthetic thermoplastic polymers since the fusion temperature thereof can be most readily controlled and/or predicted. It will be appreciated by those skilled in the art that the thermal properties of the thermoplastic material may vary or be varied by change in the molecular weight, the level of crystallinity or degree of branching, the processing history, the inert filler (if any), etc. The thermoplastic materials may contain additives other than inert fillers and will often include stabilizers to protect against deterioration as a result of high temperatures or long exposure to heat. As has been suggested, the thermoplastic should be configured for uniform heating and maximum effectiveness in producing force upon the piston so that when the cavity is cylindrical the thermoplastic should be a long thin rod or column. Although the relative dimensions may vary greatly, the ratio of length to diameter for such a rod will generally be about 15–35:1. Most desirably the coefficient of thermal expansion of the fused material is higher than the value for the material in the solid state. The polyolefins and particularly polyethylene have proven beneficial for control operation in water/low pressure steam devices.

Since the piston slides relatively freely within a portion of the body adjacent one end, it will conveniently be a cylinder having a diameter approximately equal to (but slightly smaller than) the inside diameter of the body which, in the preferred form thereof, utilizes a circular cross section. Normally the piston will be fabricated of metal which may be the same or different from that of which the body is made. However, it is important that the material of the piston have a coefficient of expansion which is smaller than or equal to that of the body since a larger coefficient will cause the piston to bind in the body due to greater expansion when the temperature rises.

In the most usual construction, the piston has a rod associated with it extending outwardly through an opening in the end of the body to which the piston is adjacent and serving to transfer motion from the actuator to a valve or equivalent device. The rod and piston may be formed integrally as a single piece, and other means by which actuation is accomplished may be substituted for the rod.

Most desirably, a seal is provided at the cavity-defining face of the piston against which the thermoplastic material may bear to exert the driving force. To be most effective the seal must span the entire width of the body to prevent the fused thermoplastic material from flowing by it thereby reducing the effectiveness and accuracy of the regulator. So that a peripheral surface of the seal can slidably bear against a corresponding portion of the sidewall of the body about its entire circumference, the seal should be made of a relatively resilient material, such as silicone rubber, and it is preferably in the form of a disc when the body cross section is circular. It should be appreciated that if such a seal is employed the piston need not be so precisely dimensioned but that care must be taken to avoid crimping the body into the seal as well as into the piston. The coefficient of expansion for the seal should be selected with respect to the body and temperature of operation so that it will not bind therein, while at the same time providing a close fitting sealing action.

To enable the regulator to function repeatedly, it is necessary that biasing means be provided to urge the piston toward the closed end thereof, which may be a compression spring secured in the body with one end bearing upon an internal shoulder of the body and the other end bearing upon the piston. When the desired function of the regulator has been accomplished and the temperature of the environment has declined, the force of the spring may push the piston toward the closed end to reset the regulator for operation in response to a subsequent temperature rise. Biasing means other than a spring may be employed, and, for example, a suitably shaped resilient rubber member may be positioned under compression against the piston for this purpose. Moreover, it will be appreciated that the spring serves to prevent spurious actuation since the force thereof should be selected so as to be overcome only by the hydraulic force of substantially the entire volume of the expanding thermoplastic material.

As will be appreciated, the thermostatic regulators of the present invention are normally employed mounted within the vessel or other structure containing the medium for which thermostatic control is desired, in such a manner that relative movement does not occur between the body of the actuator and the mounting structure. Mounting may be readily accomplished simply by drilling or otherwise providing a hole in the structure, inserting the closed end of the regulator thereinto and securing it to the structure by soldering, brazing, clamping, bolting, etc. Auxiliary mounting structure may also be provided, and it should be appreciated that a flange or body crimps, such as are shown in the drawing, may be utilized for this purpose.

Exemplary of the efficacy of the present invention is the following specific example.

EXAMPLE

An actuator substantially as described in the description of the illustrated embodiment was constructed and tested. A cylindrical copper tube about 6½ inches long, having an outside diameter of about ¼ inch and an inside diameter of about $3/16$ inch was employed for the body of the actuator. The tube was flared outwardly at one end, and was crimped about $3/16$ inch from that end to provide a restricted internal passageway having a diameter of about ⅛ inch and an annular shoulder adjacent the flared end.

A stainless steel helical compression spring having an outside diameter of about $3/16$ inch and an inside diameter of about ⅛ inch was introduced into the uncrimped end of the tube and positioned with one end thereof abutting against the annular shoulder provided by the crimped portion. Next, a cylindrical brass piston having an integral rod was introduced into the tube so that the rod passed through the helical spring and the crimped portion adjacent the flared end, with the piston resting upon the spring. The piston was about ¼ inch long and about $3/16$ inch in diameter, and the rod was about 1⅝ inches long and about $3/32$ inch in diameter.

Thereafter, a disc of silicone rubber about $3/16$ inch in diameter and ⅛ inch thick was inserted into the body and positioned against the end of the piston. The disc was designed to form a sliding seal against the wall of the body and so was dimensioned to span the entire cross section thereof. Following insertion of the rubber seal, a rod of polyethylene about $4 11/16$ inches along and $3/16$ inch in diameter was introduced. The polyethylene used has a density of about 0.923; it was relatively crystalline and had a melting point of about 260° Fahrenheit at atmospheric pressure.

Immediately adjacent the end of the polyethylene rod was next positioned a dumbbell-shaped plug of the type illustrated having a length of about ¼ inch and diameters of about $3/16$ inch at the ends and ⅛ inch at the center. The insertion of the plug compressed the spring to preload the spring to exert a biasing force on the order of 19 pounds upon the piston. The end of the body surrounding the plug was then rolled into the annular groove of the plug, thereby mechanically interlocking the plug and the body together with the other parts securely assembled therein. Thereafter, a third crimp was provided in the body about $4 3/16$ inches from the rear end thereof to provide the cavity with a restricted passageway of about ⅛ inch diameter. The polyethylene rod was completely disposed between the last mentioned crimp and the plug with only about ⅛ inch thereof located in the space between that crimp and the silicone seal.

The actuator so constructed was subjected to controlled heating conditions in a suitable bath to verify the parameters of its operation. The temperature of the bath was slowly raised at the rate of ½° Fahrenheit per minute and when it reached 205–210° Fahrenheit, the rod of the piston was abruptly thrust outwardly from the body. The response of the actuator upon reaching the predetermined operating temperature of 208° Fahrenheit was rapid. Cooling allowed the polyethylene to solidify, and the biasing force of the spring moved the piston toward the sealed end of the actuator and thereby automatically reset the device. In repeated heating and cooling cycles the actuator demonstrated closely reproducible results.

Although the theory of the invention is not fully understood, it is believed that the restriction in the body cavity inhibits the expansion of the thermoplastic, which would normally occur as a result of heating below the temperature of fusion or fluidity. As a result, pressure builds up in the thermoplastic, causing substantially complete fluidity to occur therein at a temperature which is relatively low and within a narrow range, only after which can sufficient thermoplastic material flow through the restricted passageway to enable operation of the regulator piston.

Thus, it can be seen that the present invention provides a thermostatic regulator which is responsive at a very limited temperature range and which is capable of relatively precise temperature control. The regulator is relatively simple and economical to construct and may be automatically reset for repeated operation at a high level of accuracy through many cycles of heating and cooling.

Having thus described the invention, I claim:

1. A thermostatic regulator comprising a tubular body; a piston slidably received in said body adjacent one end thereof; biasing means in said body adjacent said one end and bearing upon said piston to urge it toward the other end of said body; means spaced from said piston toward said other end of said body closing said body and defining a cavity between it and said piston; and a thermoplastic material in said cavity, said material being solid under ambient conditions and expansively fusible at an elevated temperature approaching a preselected control temperature, the volume of said material being sufficient to cause it to bear upon said piston and exert hydraulic force thereupon in said expansively fused state, said body having a constricting portion in said cavity of reduced internal cross section adjacent said piston to restrain expansive movement of said material toward said piston until said material is substantially completely fluid and to permit said substantially completely fluid material to flow thereby to bear and exert a hydraulic force upon said piston for driving it toward said one end against the force of said biasing means, said body being of substantially uniform cross section between said constricting portion and said piston to avoid influencing movement of said piston by the configuration of said body.

2. The regulator of claim 1 wherein said body is generally circular in cross section.

3. The regulator of claim 1 wherein said thermoplastic material is a synthetic polymer.

4. The regulator of claim 3 wherein said synthetic thermoplastic is polyethylene and wherein said control temperature is about 205–210° Fahrenheit.

5. The regulator of claim 1 wherein a piston rod is attached to said piston and extends axially in said body toward said one end to provide actuator means therefor.

6. The regulator of claim 5 wherein said biasing means is a helical compression spring disposed about said rod, wherein said body has an internal shoulder adjacent said one end against which one end of said spring abuts, and wherein said spring exerts a force of a magnitude sufficient to resist movement of said piston until substantially the entire volume of said thermoplastic material has expansively fused.

7. The regulator of claim 1 wherein a resilient seal is seated in said cavity in contact with the face of said piston adjacent said other end, said seal being dimensioned to span the width of said cavity with a peripheral surface thereof slidably bearing against the sidewall of said body to provide sealing action preventing flow of the thermoplastic material thereabout.

8. The regulator of claim 1 wherein said closing means is a dumbbell-shaped plug affixed in said body.

9. The regulator of claim 1 wherein said cavity-constricting portion is a crimp in said body.

10. A thermostatic regulator comprising a tubular body having a generally circular cross section; a cylindrical piston slidably received in said body adjacent one end thereof; a piston rod on the face of said piston adjacent said one end and extending axially in said body toward said one end; a helical compression spring in said body adjacent said one end and disposed about said piston rod, one end of said spring bearing upon said piston to urge it toward the other end of said body; a plug spaced from said piston toward the other end of said body and affixed therein to close said body and define a cavity between said plug and piston; a resilient seal seated in said cavity against the face of said piston adjacent said other end and dimensioned to span the width of said cavity with a peripheral surface thereof slidably bearing against the sidewall of said body to provide sealing action therewith; and a synthetic thermoplastic polymer in said cavity, said polymer being solid under ambient conditions and expansively fusible at an elevated temperature approaching a preselected control temperature, said polymer substantially filling the volume of said cavity between said seal and plug, said body having a constricting portion of reduced internal cross section in the portion of said cavity receiving said thermoplastic material and closely adjacent said seal to restrain expansive movement of said polymer toward said piston until said polymer is substantially completely fluid and to permit said substantially completely fluid polymer to flow thereby to bear and exert a hydraulic force upon said seal and piston for driving them, and thereby said piston rod, toward said one end against the force of said spring, said body being of substantially uniform cross section between said constricting portion and said piston to avoid influencing movement of said piston by the configuration of said body.

11. The regulator of claim 10 wherein said control temperature is about 205–210° Fahrenheit and wherein said polymer is polyethylene.

12. The regulator of claim 10 wherein said cavity-constricting portion is a crimp in said body.

13. The regulator of claim 10 wherein said body has a crimp adjacent said one end to provide a shoulder against which the other end of said spring abuts and wherein said plug is affixed in said body by inwardly deformed portions thereof.

References Cited

UNITED STATES PATENTS

| | | |
|---|---|---|
| 3,016,691 | 1/1962 | Asakawa et al. ___ 73—368.3 XR |
| 3,194,009 | 7/1965 | Baker _____ 73—368.3 XR |
| 3,234,793 | 2/1966 | Uernet _____ 73—368.3 |
| 3,330,480 | 7/1967 | Drapeau et al. ___ 73—368.3 XR |

LOUIS R. PRINCE, Primary Examiner

WILLIAM A. HENRY, Assistant Examiner

U.S. Cl. X.R.

236—100